United States Patent [19]

Blackburn

[11] Patent Number: 4,640,449
[45] Date of Patent: Feb. 3, 1987

[54] HANDLE BAR MOUNTED QUICK DISCONNECT BOTTLE CAGE

[75] Inventor: James R. Blackburn, Los Gatos, Calif.

[73] Assignee: Jim Blackburn Designs, Inc., Campbell, Calif.

[21] Appl. No.: 690,952

[22] Filed: Jan. 10, 1985

[51] Int. Cl.⁴ .............................................. B62J 7/00
[52] U.S. Cl. .................................... 224/41; 224/30 A
[58] Field of Search .................... 224/30 A, 36, 39, 41

[56] References Cited

U.S. PATENT DOCUMENTS

| | | | |
|---|---|---|---|
| 3,744,688 | 7/1973 | Kezer | 224/39 X |
| 3,853,253 | 12/1974 | Hawkins et al. | 224/39 |
| 4,009,810 | 3/1977 | Shook | 224/32 R X |
| 4,315,583 | 2/1982 | Hine, Jr. | 224/41 |
| 4,415,105 | 11/1983 | Jackson | 224/39 X |
| 4,440,332 | 4/1984 | Kullen | 224/30 A X |

FOREIGN PATENT DOCUMENTS

| | | | |
|---|---|---|---|
| 521480 | 3/1921 | France | 224/36 |
| 2507990 | 12/1982 | France | 224/30 A |
| 2514313 | 4/1983 | France | 224/36 |

*Primary Examiner*—Charles E. Phillips
*Assistant Examiner*—Robert M. Petrik
*Attorney, Agent, or Firm*—Hamrick, Hoffman, Guillot & Kazubowski

[57] ABSTRACT

A bicycle bottle cage having an attachment mechanism that will securely fasten the cage to the handle bars of a bicycle. The bottle cage portion has a generally conventional configuration. An attachment bracket is welded to the rear portion of the cage and includes a continuous loop formed to serpentine fashion to extend over the handle bars and beside and over the goose neck. A clamp plate extends beneath the goose neck to engage each side of the attachment bracket. The clamp plate includes a lock screw which engages the bottom of the goose neck to firmly attach the bracket thereto.

3 Claims, 4 Drawing Figures

U.S. Patent  Feb. 3, 1987  Sheet 1 of 2  4,640,449
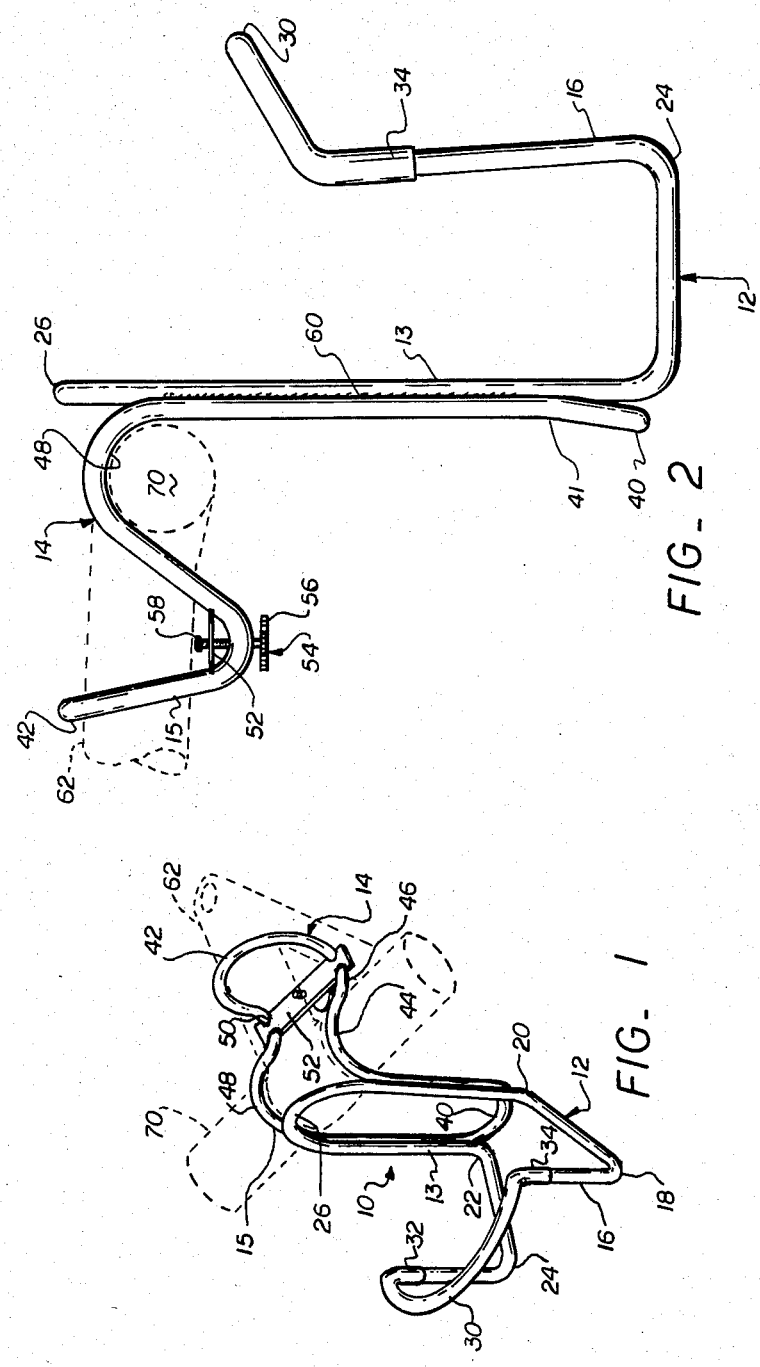

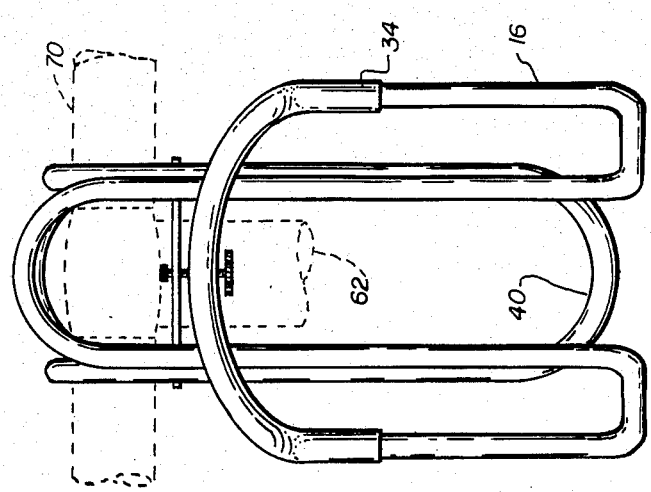
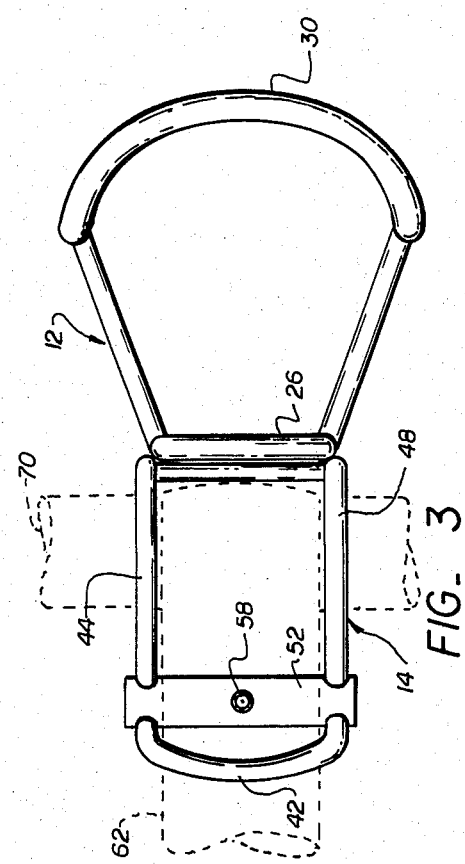

HANDLE BAR MOUNTED QUICK DISCONNECT BOTTLE CAGE

BACKGROUND OF THE INVENTION

1. Field of the Invention

This invention relates generally to bottle cage devices for bicycles and more particularly, to an improved bottle cage mechanism having means for quickly mounting and dismounting the bottle cage from the handle bar of a bicycle.

2. Discussion of the Prior Art

Various types of bottle cages for bicycles are available in the prior art including those specifically designed for mounting to the frame of a bicycle and those specifically designed for mounting to the handle bars of a bicycle. Such devices are shown in U.S. Pat. No. 4,009,810 entitled "Water Bottle Cage" issued to William Blair Shook and on page 69 of the Bikecology Mail Order Catalog dated January, 1982.

With regard to cages adapted for mounting to a handle bar, a cross bracket is normally provided along with a pair of straps which secure each side of the bracket and thus the cage to the handle bars. Such apparatus is typically less than satisfactory in that the cage often distorts relative to the bracket, or even separates therefrom, or the straps fail to provide rigid attachment to the handle bar. In addition, such devices are inconvenient to use where the rider wishes to remove the cage when its use is not needed.

SUMMARY OF THE PRESENT INVENTION

It is therefore an objective of the present invention to provide a novel bottle cage design which is sturdy enough to perform its intended function for an extended period of time, includes an attachment mechanism that will securely fasten the cage to the handle bars, and includes means for enabling the apparatus to be quickly connected to and disconnected from the handle bars.

Briefly, the present invention includes a cage portion of generally conventional configuration having welded to the rear portion thereof an attachment portion forming a support bracket which includes a continuous loop deformed in serpentine fashion to extend over the handle bars and beside and over the goose neck. A clamp plate extends beneath the goose neck to engage each side of the support bracket and includes a lock screw which engages the bottom of the goose neck to firmly attach the bracket thereto.

An important advantage of the present invention is that it provides a handle bar mounted bottle cage which can be quickly attached to or detached from the bicycle handle bars. Another advantage of the present invention is that it provides a strong and relatively rigid bottle cage supporting structure.

These and other objects and advantages of the present invention will no doubt become apparent to those skilled in the art after having read the following detailed description of the preferred embodiment shown in the several figures of the drawing.

IN THE DRAWING

FIG. 1 is a perspective view illustrating a handle bar mounted bottle cage in accordance with the present invention;

FIG. 2 is a side elevation thereof;

FIG. 3 is a top elevation thereof; and

FIG. 4 is a front elevation thereof.

DETAILED DESCRIPTION OF THE PREFERRED EMBODIMENT

Referring now to the drawing, a preferred embodiment of the present invention is shown at 10 and is comprised of a bottle cage portion 12 and attachment portion 14. Bottle cage portion 12 is similar in configuration to prior art bottle cage structures and includes a first part 16 fabricated of solid aluminum rod with 90° bends at 18, 20, 22, and 24. Member 16 also has a gentle 180° bend at 26.

Spanning the ends of member 16 is a bowed bridge member 30, the ends of which telescopically receive the ends of member 16 and are attached thereto by either welding or crimping. Member 30 may be either tubular or solid with the end portions 32 and 34 axially drilled to receive the ends of member 16.

Attachment portion 14 is comprised of a continuous loop of solid rod stock forming a support bracket member 15 having gentle 180° bends 40 and 42 at opposite extremities thereof and a pair of less than 180° bends on each side as indicated at 44, 46, 48 and 50. Extending between the bends 46 and 50 is a clamp plate 52 having notches formed at each end to mate with the bent rod. A threaded bore is provided in plate 52 for receiving a lock screw 54 which is provided with a thumb wheel 56 on one end and a cap 58 on the other end.

As will be noted particularly in FIG. 2 of the drawing, the width of the loop of bracket member 15 is slightly wider than the width of the upstanding rear part 13 of cage portion 12 and is welded thereto along the engagement lines as indicated at 60 (FIG. 2). In order to allow the lower extremity 40 of member 15 to clear the vertically upstanding parts of portion 12, a slight offset bend is provided at 41.

In order to mount the device to a handle bar 70, as indicated by the dashed lines in the several figures of the drawing, bracket member 15 is positioned so that the bends 44 and 48 loop over and engage the upper surface of the handle bar 70 while the laterally extending side members including the bends 46 and 50 extend rearwardly about each side of the handle bar supporting goose neck 62 with the bend 42 looping over and engaging the top surface thereof. The clamp plate 52 is then inserted beneath the goose neck 62 with the notches in each end thereof placed in engagement with member 15 at the bends 46 and 50. Thumb wheel 56 is then rotated until the cap 58 engages the bottom of the goose neck 62 and draws member 15 into engagement therewith.

So positioned, it will be noted that the engagement of bend 42 with the top of goose neck 62 prevents the cage apparatus from rotating upwardly about the handle bar; the engagement of screw 54 with the bottom of the goose neck 62 prevents downward rotation relative to the handle bar; and lateral oscillation is prevented by the 3 point engagement of thumb screw 54 with goose neck 62 and bends 44 and 48 with handle bar 60.

In order to remove the apparatus from the handle bar, one need merely unthread the screw 54, slip plate 52 out of engagement with bracket member 15 and then lift the apparatus out of engagement with the handle bar and goose neck. This operation as well as the attachment operation can conveniently be accomplished with one hand.

As an alternative to the illustrated configuration, it will be appreciated that in place of the plate 52, any other type of latching mechanism could be utilized.

Furthermore, it will be appreciated that the bends provided in portion 14 may be of greater or lesser degree than that illustrated without materially affecting the function and/or operation of the device.

Whereas a preferred embodiment of the present invention has been described above, it is anticipated that many alterations and modifications of the present invention will become apparent to those skilled in the art after having read the above detailed disclosure. It is therefore intended that the appended claims be interpreted to cover all such alterations and modifications as fall within the true spirit and scope of the invention.

What is claimed is:

1. Bottle cage apparatus for mounting to the handle bar of a bicycle proximate the goose neck thereof comprising:

means forming a bottle cage for receiving a bottle of liquid and holding said bottle forwardly of said handle bar and including at least one upstanding member disposed rearwardly of said bottle and forwardly of said handle bar when said cage is mounted to said bicycle; and an attachment means including a bracket member having a first portion secured to said upstanding member and having a second portion commencing at said first portion and extending over and rearwardly of said handle bar when said cage is mounted to said bicycle with a first bend of less than 180° which passes over said handle bar and thence downwardly followed by a second bend of less than 180° upwardly, such that said second portion is disposed below said goose neck at the location of said second bend, a laterally extending third portion extending from said second portion and passing upwardly over said goose neck and thence downwardly, said third portion having a third bend of substantially 180° located at approximately the mid-point of said third portion, and a forwardly extending fourth portion extending from said third portion and including a less than 180° fourth bend upwardly such that said fourth portion is disposed below said goose neck at the location of said fourth bend followed by a less than 180° fifth bend, said fourth portion extending over said handle bar at said fifth bend and extending to a fifth portion that is attached to said upstanding member; and a clamp means coupling said second and fourth portions at said second and fourth bends to said goose neck and including means for lockingly engaging the bottom of said goose neck enveloped by said clamp member and the portion of said bracket member forming said third bend;

whereby said apparatus may be securely attached to the goose neck and handle bar of a bicycle.

2. Bottle cage apparatus as recited in claim 1 wherein said bracket member includes a sixth portion having a sixth bend coupling said first and fifth portions to form a continuous loop with said first and fifth portions.

3. Bottle cage apparatus as recited in claim 2 wherein said clamp means includes a relatively rigid elongated plate adapted at each end thereof to engage said second portion and said fourth portion at the second and fourth bends thereof respectively, and a screw threadably passing through said plate for contact with said bottom of said goose neck.

* * * * *